(12) United States Patent
Grimberg et al.

(10) Patent No.: US 7,405,010 B2
(45) Date of Patent: *Jul. 29, 2008

(54) METAL/RUBBER COMPOSITE FOR TIRE

(75) Inventors: Bruno Grimberg, Varennes-sur-Morge (FR); Yves Ravoire, Clermont-Ferrand (FR); Jean-Claude Tardivat, Clermont-Ferrand (FR); Le Tu Anh Vo, Guyancourt (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/364,993

(22) Filed: Mar. 1, 2006

(65) Prior Publication Data

US 2006/0147731 A1 Jul. 6, 2006

Related U.S. Application Data

(63) Continuation of application No. 10/353,144, filed on Jan. 28, 2003, which is a continuation of application No. PCT/EP01/08568, filed on Jul. 25, 2001, now Pat. No. 7,066,228.

(30) Foreign Application Priority Data

Jul. 31, 2000 (FR) .................................. 00 10097

(51) Int. Cl.
*B32B 15/02* (2006.01)
*B32B 15/04* (2006.01)
*B32B 15/06* (2006.01)
*B32B 15/18* (2006.01)
*B32B 15/20* (2006.01)

(52) U.S. Cl. ........................ 428/625; 428/457; 428/461; 428/465; 428/472.2; 428/626; 428/650; 428/653; 428/654; 428/681; 428/684

(58) Field of Classification Search ................. 428/524, 428/625, 626, 650, 652, 653, 654, 681, 684, 428/457, 461, 462, 465, 469, 472.2, 492; 152/151, 451, 525

See application file for complete search history.

(56) References Cited

U.S. PATENT DOCUMENTS

| 3,664,403 | A | | 5/1972 | Doran et al. |
| 4,689,085 | A | | 8/1987 | Plueddemann |
| 5,342,699 | A | | 8/1994 | DeWitte |
| 5,958,161 | A | | 9/1999 | Grimberg et al. |
| 5,977,238 | A | | 11/1999 | Labauze |
| 6,132,808 | A | * | 10/2000 | Brown et al. ................. 427/387 |
| 6,207,757 | B1 | | 3/2001 | Obrecht |
| 6,416,869 | B1 | | 7/2002 | van Ooji et al. |
| 7,066,228 | B2 | * | 6/2006 | Grimberg et al. ........... 152/548 |
| 2002/0061409 | A1 | | 5/2002 | Topp et al. |

FOREIGN PATENT DOCUMENTS

| EP | 0 978 531 A | | 2/2000 |
| FR | 2 765 882 A | | 1/1999 |
| JP | 61 159902 A | | 7/1986 |
| JP | 63 288283 A | | 11/1988 |
| WO | WO 91/01389 A | | 2/1991 |
| WO | WO 99/20705 A | | 4/1999 |
| WO | WO 00/23504 | * | 4/2000 |

* cited by examiner

*Primary Examiner*—Michael La Villa
(74) *Attorney, Agent, or Firm*—Cohen Pontani Lieberman & Pavane LLP (57) ABSTRACT

A metallic body of carbon steel covered with an adhesive layer capable of adhering to a rubber matrix based on diene elastomer. The carbon content of the steel is between 0.35 and 1.2% by weight. The adhesive layer is formed of a metallic layer bearing aluminum oxides or hydroxides, which itself is covered with an organosilane film which is at least bifunctional, capable of ensuring, as coupling agent, the bond between the aluminum oxides or hydroxides on one hand, and the rubber matrix on the other hand.

12 Claims, 1 Drawing Sheet

METAL/RUBBER COMPOSITE FOR TIRE

RELATED APPLICATIONS

The present application is a continuation of U.S. patent application Ser. No. 10/353,144 filed Jan. 28, 2003, now U.S. Pat. No. 7,066,228, which is a continuation of International application no. PCT/EP01/08568, flied Jul. 25, 2001 which claims priority to French Patent Application No. FR00/10097, filed 31 Jul. 2000. The disclosure of U.S. patent application Ser. No. 10/353,144 is incorporated herein by reference.

FIELD OF THE INVENTION

The present invention relates to (metal/rubber) composites and in particular to the adhesive interphases providing the bond between metal and rubber in such composites.

It relates more particularly to sulphur-vulcanizable (carbon steel/rubber) composites usable for the manufacture of tires.

BACKGROUND OF THE INVENTION (Metal/rubber) composites for tires are known and have been described in a very large number of documents. They are generally constituted of a rubber matrix reinforced with reinforcing members, most frequently in the form of wires or assemblies of wires, of perlitic (or ferro-perlitic) carbon steel, hereinafter referred to as "carbon steel", the carbon content of which is normally between 0.35% and 1.2% (% by weight).

It is known that these composites, which are subject to very great stresses during running of the tires, in particular to repeated flexing or variations in curvature, must satisfy a large number of technical criteria, which are sometimes contradictory, such as uniformity, flexibility, endurance under bending and in compression, tensile strength, resistance to wear and to corrosion, and keep these performances at a very high level for as long as possible. It will readily be understood that the adhesive interphase between rubber and metal plays a major part in the durability of these types of performance.

The traditional process for joining the rubber compositions to the carbon steel consists of coating the surface of the carbon steel with brass (copper-zinc alloy), the bond between the carbon steel and the rubber composition being provided by sulphurisation of the brass during vulcanization. To ensure optimum adhesion, furthermore frequently an adhesion-promoting additive such as a cobalt salt is used in the rubber composition.

The brass coating has the known disadvantage that the adhesion between the carbon steel and the rubber matrix is liable to weaken over time, owing to the gradual evolution of the sulphides under the action of the various stresses encountered, in particular thermal and/or mechanical stresses. Furthermore, the presence of humidity in the tires plays a very important part by accelerating the above degradation process. Finally, the use of a cobalt salt makes the rubber compositions more susceptible to oxidation and significantly increases the cost thereof.

Admittedly, here or there wires or cables of carbon steel have been proposed which have different alternating coatings, in particular alloys of zinc such as zinc-cobalt or zinc-aluminum (see for example Wire Journal International 31, No. 10, October 1998, pp 78-82; WO91/01389 or equivalent patents EP-B1-0 483 198; U.S. Pat. No. 5,342,699), but until now without real success or commercial development.

In particular, application WO91/01389 proposes, as a replacement for the brass, a specific zinc-aluminum alloy, having a low percentage of aluminum, which has been known for a long time for its corrosion resistance, this alloy possibly being covered by a second layer of metal or metal alloy, in particular of cobalt, to improve the adhesion. Although the wires and cables described have improved corrosion resistance, the levels of adhesion achieved are insufficient, less than those offered by a conventional brass coating.

Thus, despite the aforementioned drawbacks of brass, the latter today still constitutes the reference adhesive interphase, the one which is by very far most used in (carbon steel/rubber) composites for tires, in particular in carcass or crown reinforcements therefor.

SUMMARY OF THE INVENTION

One aspect of the invention is directed to a metallic body of carbon steel covered with an adhesive layer capable of adhering to a rubber matrix based on diene elastomer. The carbon content of the steel is between 0.35 and 1.2% by weight. The adhesive layer is formed of a metallic layer bearing aluminum oxides or hydroxides, which itself is covered with an organosilane film which is at least bifunctional, capable of ensuring, as coupling agent, the bond between the aluminum oxides or hydroxides on one hand, and the rubber matrix on the other hand.

DETAILED DESCRIPTION OF THE SINGLE DRAWING

I. Measurements and Tests

I-1. Dynamometric Measurements

As far as the metallic reinforcing members (wires or cables) are concerned, the measurements of breaking load Fm (maximum load in N), of tensile strength Rm (in MPa) and elongation at break At (total elongation in %) are taken under traction in accordance with Standard ISO 6892 of 1984. As far as the rubber compositions are concerned, the measurements of modulus are taken under traction, unless indicated otherwise in accordance with Standard ASTM D 412 of 1998 (test piece "C"); the true secant moduli, that is to say reduced to the real section of the test piece at 10% elongation, referred to as E10 and expressed in MPa (normal conditions of temperature and humidity in accordance with Standard ASTM D 1349 of 1999), are measured in a second elongation (i.e. after an accommodation cycle).

I-2. Adhesion Test

The quality of the bond between the metallic reinforcing member and the rubber matrix is assessed by a test in which the force, referred to as tearing force, necessary to extract the metallic reinforcing member from the rubber matrix, in the vulcanized state, is measured.

The (metal/rubber) composite used in this test is a block of rubber composition, formed of two plates of dimension 300 mm by 150 mm (millimeters) and of a thickness of 3.5 mm, which are applied to one another before curing; the thickness of the resulting block is then 7 mm. It is during the building of this block that the reinforcing members, for example twelve in number, are imprisoned between the two uncured plates; only one given length of reinforcing member, for example 12.5 mm, is left free to come into contact with the rubber composition to which this length of reinforcing member will become joined during curing; the rest of the length of the reinforcing members is isolated from the rubber composition (for example using a plastic or metallic film) to prevent any adhesion outside the given contact zone. Each reinforcing member passes right through the block of rubber, at least one of its free ends being kept of sufficient length (at least 5 cm, for example between 5 and 10 cm) to permit later tensile loading of the reinforcing member.

The block comprising the twelve reinforcing members is then placed in a suitable mould and then cured for 40 minutes at 150° C., at a pressure of approximately 11 bar.

After curing the composite, if applicable, the accelerated ageing conditions below are applied, which make it possible to determine the resistance of the samples to the combined action of heat and water on one hand, and a corrosive atmosphere on the other hand:

- either what is called "wet" ageing: the blocks of rubber are placed in an oven at a temperature of 40° C. and at a relative humidity of 60%, for a given time which may vary for example from 3 to 17 weeks;
- or what is called "wet and corrosive" ageing: the blocks of rubber are placed in an oven at a temperature of 70° C. and at a relative humidity of 100%, for three weeks; on emerging from this first ageing process, half of the block of rubber is immersed for 4 days in water at 30° C. which is saturated with sodium chloride (approximately 3-4% salt); the non-immersed half is the one bearing the free end of the reinforcing member intended for the tensile loading to measure the residual adhesion;
- or what is called "corrosive" ageing: the blocks of rubber are immersed directly in the saline solution, as indicated above, for a given time which may vary, for example, from 4 days to several weeks.

On emerging from the curing and any subsequent ageing, the block is cut into test pieces acting as samples, each containing a reinforcing member which is drawn out of the block of rubber, using a traction machine; the traction rate is 50 mm/min; thus the adhesion is characterized by the force necessary to tear the reinforcing member from the test piece, at a temperature of 20° C.; the tearing force, hereafter referred to as Fa, represents the average of the 12 measurements corresponding to the 12 reinforcing members of the composite.

I-3. Belt Test

The "belt" test is a known fatigue test which was described, for example, in application EP-A-362 570, the reinforcing members to be tested, generally in the form of cables, being incorporated in a rubber matrix which is vulcanized.

The principle thereof is as follows: the (metal/rubber) composite is an endless belt produced with a known rubber-based mixture, similar to those which are commonly used for the reinforcement armatures of the carcasses of radial tires, this belt being reinforced with cables, the axis of which is oriented in the longitudinal direction of the belt; the cables are separated from the faces of this belt by a thickness of rubber of about 1 mm. When the belt is arranged so as to form a cylinder of revolution, the cable forms a helical winding of the same axis as this cylinder (for example, helix pitch equal to about 2.5 mm).

This belt is then subjected to the following stresses: the belt is rotated around two rollers, such that each elementary portion of each cable is subjected to a tension of 12% of the initial breaking load and is subjected to cycles of variation of curvature which make it pass from an infinite radius of curvature to a radius of curvature of 40 mm, and this over 50 million cycles.

The test is carried out under a controlled atmosphere, the temperature and the humidity of the air in contact with the belt being kept at about 20° C. and 60% relative humidity. The duration of the stresses for each belt is of the order of three weeks. At the end of these stresses, the cables are extracted from the belts by decortication, and the residual breaking load of the cables (and that of their wires) which are thus fatigued is measured.

Furthermore, a belt is manufactured which is identical to the previous one, and it is decorticated in the same manner as previously, but this time without subjecting it to the fatigue test. Thus the initial breaking load of the non-fatigued cables (and that of their wires) is measured.

Finally the breaking-load degeneration after fatigue is calculated (referred to as ΔFm and expressed in %), by comparing the residual breaking load with the initial breaking load.

This degeneration ΔFm is due in known manner to the fatigue and wear of the composite which is caused by the joint action of the stresses and the water coming from the ambient air, these conditions being comparable to those to which the (metal/rubber) composites are subjected in tire carcass reinforcements.

II. Detailed Description of the Invention

The (metal/rubber) composites according to the invention consist of a rubber matrix reinforced with a metallic body made of carbon steel.

The adhesive interphase (carbon steel/rubber) is provided by an intermediate metallic layer, laid on the carbon steel, bearing aluminum oxides or hydroxides, this intermediate metallic layer itself being covered with an organosilane film which ensures, as coupling agent, the bond between the aluminum oxides or hydroxides on one hand, and the rubber matrix on the other hand.

II-1. Rubber Matrix

The matrix is a rubber composition based on (i.e. formed of) at least one diene elastomer and comprising, in addition to this diene elastomer, all the conventional ingredients such as reinforcing filler, cross-linking system and other additives usable in rubber compositions for tires.

A) Diene Elastomer

"Diene" elastomer is understood to mean, in known manner, an elastomer resulting at least in part (i.e. a homopolymer or a copolymer) from diene monomers, that is to say monomers bearing two double carbon-carbon bonds, whether conjugated or not.

Generally, "essentially unsaturated" diene elastomer is understood here to mean a diene elastomer resulting at least in part from conjugated diene monomers, having a content of members or units of diene origin (conjugated dienes) which is greater than 15% (mole %). Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the diene elastomer of the composite according to the invention is preferably selected from among the group consisting of polybutadienes, natural rubber, synthetic polyisoprenes, the various butadiene copolymers, the various isoprene copolymers and mixtures of these elastomers.

Of the polybutadienes, in particular those having a content of -1,2 units of between 4% and 80% or those having a content of cis-1,4 greater than 80% are suitable. Of the synthetic polyisoprenes, in particular cis-1,4-polyisoprenes, preferably those having an amount of cis-1,4 bonds greater than 90%, are suitable. Among the butadiene or isoprene copolymers, these are understood to be in particular the copolymers obtained by copolymerization of at least one of these two monomers with one or more vinyl-aromatic compounds having from 8 to 20 carbon atoms. Suitable vinyl-aromatic compounds are, for example, styrene, ortho-, meta- and para-methylstyrene, the commercial mixture "vinyltoluene", para-tert. butylstyrene, methoxystyrenes, chlorostyrenes, vinylmesitylene, divinylbenzene and vinylnaphthalene. The copolymers may contain between 99% and 20% by weight of diene units and between 1% and 80% by weight of vinyl-aromatic units. Of the butadiene or isoprene copolymers above, mention will preferably be made of butadiene-styrene copolymers, isoprene-butadiene copolymers, isoprene-styrene copolymers or isoprene-butadiene-styrene copolymers.

In summary, preferably a diene elastomer selected from the group of highly unsaturated diene elastomers consisting of polybutadienes (BR), natural rubber (NR), synthetic polyisoprenes (IR), butadiene-styrene copolymers (SBR), isoprene-butadiene copolymers (BIR), isoprene-styrene copolymers (SIR), butadiene-styrene-isoprene copolymers (SBIR) and mixtures of these elastomers is suitable.

The composites according to the invention are preferably intended for tires, in particular for the carcass reinforcements of tires for industrial vehicles such as vans or heavy vehicles, and to crown reinforcements for tires intended both for passenger vehicles and for industrial vehicles.

Then, preferably, matrices based on natural rubber or synthetic polyisoprene are used. This is understood to mean rubber matrices in which the diene elastomer is formed majoritarily (i.e. by more than 50% by weight) of natural rubber, synthetic polyisoprene or a mixture of these elastomers. Advantageously, the diene elastomer is formed exclusively of natural rubber, synthetic polyisoprene or a mixture of these elastomers.

However, it is also possible, in accordance with another advantageous embodiment of the invention, to use blends (mixtures) of these polyisoprenes with other highly unsaturated diene elastomers, in particular with SBR or BR elastomers as mentioned above.

Of course, the rubber matrices of the composites of the invention may contain a single or several diene elastomer(s), the latter possibly being used in association with any type of synthetic elastomer other than a diene elastomer, or even with polymers other than elastomers, for example thermoplastic polymers.

B) Other Constituents

The rubber matrices of the composites according to the invention also comprise all or part of the additives usually used in rubber matrices intended for the manufacture of tires, such as reinforcing fillers such as carbon black or silica, anti-ageing agents, for example antioxidants, extender oils, plasticisers or agents which facilitate processing of the compositions in the uncured state, a cross-linking system based on either sulphur, or sulphur and/or peroxide donors, accelerators, vulcanization activators or retarders, methylene acceptors and donors, resins, known adhesion-promoting systems of the type "RFS" (resorcinol-formaldehyde-silica) or metallic salts, in particular cobalt salts.

For example, a reinforcing resin may be used with the aim of providing the bond between the organosilane film and the rubber composition itself, by means of this reinforcing resin, the latter possibly being obtained in situ, during the curing of the rubber composition. The composition then contains, before the curing, the base constituents of this resin, for example a methylene acceptor such as resorcinol and a methylene donor (curing agent) such as hexamethylenetetramine ("HMT") or alternatively hexamethoxymethylmelamine ("HMMM", also referred to as "H3M").

The terms "methylene acceptor" and "methylene donor" are well-known to the person skilled in the art and are widely used to designate compounds liable to react together to generate a three-dimensional reinforcing resin by condensation. The term "methylene acceptor" designates the reactant with which the methylene donor compound reacts by forming methylene bridges (—CH2—), upon the curing of the composition, thus resulting in the formation in situ of a three-dimensional resin network; there must be associated with this methylene acceptor a curing agent, capable of cross-linking or hardening it, also commonly referred to as "methylene donor". The cross-linking of the resin is then caused upon the curing of the rubber matrix, by formation of (—CH$_2$—) bridges.

The resin used is then preferably suited to the nature of the organosilane used.

For example, if the organosilane selected contains an aminated function, the rubber composition will advantageously contain a reinforcing resin of the phenol-formol type or a resin of the resorcinol-formol type, the formol possibly being replaced by other methylene donors.

If the organosilane selected contains a mercapto, polysulphide, azide, alkene or activated alkene function, the composition may then contain a simple cross-linking system (for example sulphur, a vulcanization accelerator, a peroxide), the functionalized organosilane then reacting directly with the rubber upon vulcanization.

To reinforce further the performance of the composite of the invention, one particularly preferred embodiment of the invention consists of incorporating a bismaleimide compound in the rubber matrices. This type of compound, usable without a curing agent, has curing kinetics which are well suited to those of tires; it is capable of activating the adhesion kinetics and of improving further the endurance under conditions of wet ageing of the adhesive interphases in the composites according to the invention.

It will be recalled that bismaleimides correspond, in known manner, to the following formula:

in which R is an aromatic or aliphatic, cyclic or acyclic hydrocarbon radical, whether substituted or non-substituted, such a radical possibly comprising a heteroatom selected from among O, N and S; this radical R preferably comprises from 2 to 24 carbon atoms.

More preferably a bismaleimide is used which is selected from the group consisting of N,N'-ethylene-bismaleimides, N,N'-hexamethylene-bismaleimides, N,N'-(m-phenylene)-bismaleimides, N,N'-(p-phenylene)-bismaleimides, N,N'-(p-tolylene)-bismaleimides, N,N'-(methylenedi-p-phenylene)-bismaleimides, N,N'-(oxydi-p-phenylene)-bismaleimides and mixtures of these compounds. Such bismaleimides are well-known to the person skilled in the art and have been described for example in FR-A-2 611 209 or U.S. Pat. No. 4,818,601, EP-A-0 345 825 or U.S. Pat. No. 4,803,250, EP-A-0 564 966, U.S. Pat. No. 5,300,585.

In the event that a reinforcing resin or a bismaleimide is used, it is present in the composite of the invention in a preferred amount of between 0.1 and 20%, more preferably between 1% and 8%, by weight of rubber composition. For amounts greater than the maxima indicated, there is a greater or lesser risk of excessive stiffening of the compositions, and therefore embrittlement of the composites; for amounts less than the minima indicated, the technical effect risks being inadequate.

II-2. Metallic Body

As indicated previously, the metallic body of the composite of the invention is a carbon steel reinforcing member, the carbon content of which (% by weight of steel) is between 0.35 and 1.2%, preferably between 0.50 and 1.1%.

"Reinforcing member" is to be understood to mean here, in known manner, any reinforcement element capable of reinforcing the rubber matrix. This reinforcing member may be in different forms, for example in the form of a unit wire (monofil), a strip or band, an assembly of wires such as a cable, or even in the state of short fibres.

In the tires of the invention, this reinforcing member is most frequently in the form of an assembly of wires, for example a cable or a strand manufactured with cabling or stranding devices and processes known to the person skilled in the art, which are not described here in order to simplify the description.

The carbon content is more preferably between 0.60% and 1.0%, even more preferably still between 0.68% and 0.95%; these contents represent a good compromise between the mechanical properties required for the tire and the feasibility of the wires. It should be noted that, in applications in which the highest mechanical strengths are not necessary, advantageously carbon steels may be used, the carbon content of which is between 0.50% and 0.68%, and in particular varies from 0.55% to 0.60%, such steels ultimately being less costly because they are easier to draw.

Of course, the person skilled in the art will be able to adapt the composition of the carbon steel according to his own particular needs, using for example micro-alloyed carbon steels containing specific addition elements such as Cr, Ni, Co, V, or various other known elements (see for example Research Disclosure 34984—"*Micro-alloyed steel cord constructions for tyres*"—May 1993; Research Disclosure 34054—"*High tensile strength steel cord constructions for tyres*"—August 1992).

When the composites of the invention are used to reinforce carcass or crown reinforcements for radial tires, the reinforcing members used are preferably assemblies (strands or cables) of fine wires of carbon steel having:

a tensile strength greater than 2000 MPa, more preferably greater than 2500 MPa, in particular greater than 3000 MPa; the person skilled in the art will know how to manufacture fine wires having such strength, by adjusting in particular the carbon content of the steel and the final work-hardening ratios of these wires;

for a good compromise of strength/flexural strength/feasibility, a diameter φ of between 0.12 and 0.40 mm, more preferably within a range from 0.15 to 0.26 mm approximately when the composite is intended to reinforce a carcass reinforcement, within a range from 0.20 to 0.35 mm approximately when the composite is intended for reinforcing a crown reinforcement.

When the composites of the invention are used to reinforce bead zones of tires, the reinforcing members may be in particular in the form of bead cores formed of carbon steel wires, whether unit or assembled ones, these wires having:

a tensile strength greater than 1500 MPa, more preferably greater than 2000 MPa;

a diameter φ (or a characteristic dimension, if it is a wire which is other than cylindrical) of between 0.5 and 3 mm, more preferably between 0.8 and 2.2 mm.

II-3. Adhesive Interphase

As indicated previously, the adhesion between the carbon steel reinforcing member and the rubber matrix is provided by a specific adhesive interphase.

This specific adhesive interphase is formed of a first metallic layer referred to as "intermediate" layer, which is other than of carbon steel, covering said carbon steel substrate and the function of which is to support the aluminum oxides or hydroxides. This intermediate layer is itself covered with an organosilane film in contact with the rubber; the organosilane, which is at least bifunctional, as coupling agent provides the bond between the intermediate metallic layer and the rubber matrix.

A) Intermediate Metallic Layer

The essential characteristic of the intermediate metallic layer is to support the aluminum oxides or hydroxides intended to be bonded to the rubber matrix by means of the organosilane coupling agent.

"Aluminum oxide and/or hydroxide" is to be understood here to mean, in known manner, a compound corresponding, apart from impurities and the water of hydration, to the following general formula (a and b being integers or fractions):

$$Al(OH)_a O_b, \text{ with: } 0 \leq a \leq 3 \text{ and } b=(3-a)/2.$$

Such a formula covers the cases of aluminas $Al_2O_3$ (a=0), aluminum tri-hydroxides $Al(OH)_3$ (a=3), aluminum oxide-hydroxides (0<a<3) and any mixture of such oxides or hydroxides.

Preferably, in the composite according to the invention, the metal of the intermediate layer acting as a support for the oxides or hydroxides above is aluminum or an aluminum alloy, selected for example from among the binary or ternary aluminum alloys known to the person skilled in the art such as binary alloys Al—Mg, Al—Cu, Al—Ni, Al—Zn or ternary alloys of Al and two of these other elements. In fact, aluminum and its alloys naturally comprise, at least at the surface, a large number of these oxides/hydroxides. Preferably, the aluminum alloy is a binary Al—Zn alloy.

However, any other metallic support capable of adhering to the carbon steel substrate would be suitable, provided that it comprises, at least at the surface, aluminum oxides or hydroxides in contact with the organosilane film.

The intermediate metallic layer is laid on the reinforcing member or on the individual elements making up this reinforcing member, in particular when it is an assembly, by any process known to the person skilled in the art which is capable of applying, continuously or discontinuously, an aluminum or aluminum alloy coating to a carbon steel substrate. For example, a simple technique of continuous dipping, in a bath containing the aluminum or the aluminum alloy in the molten state, a technique of deposition by electrolysis or alternatively by a spraying process, will be used.

In the most frequent case in which the reinforcing member used is a cable formed of fine wires of carbon steel, the intermediate metallic layer will preferably be deposited on the wires, and not on the final cable. In such a case, in particular to facilitate the drawing operations, the deposition will be advantageously effected on a wire of what is called an "intermediate" diameter, for example of the order of one millimeter, upon emerging from the last heat treatment (patenting) preceding the final wet drawing stage to obtain the fine wire having the intended final diameter.

B) Organosilane Film

The function of the organosilane film is to provide, as (metal/rubber) coupling agent, the bond between the aluminum oxides/hydroxides on one hand and the rubber matrix on the other hand. It must therefore have on one hand at least one function which is reactive with respect to the aluminum oxides or hydroxides, and on the other hand at least one function which is reactive with respect to the diene elastomer itself (or at least one of these elastomers if several are used) and/or another constituent present in the rubber composition, for example a reinforcing resin.

It will be recalled here that (metal/rubber) "coupling" agent is to be understood in known manner to mean an agent capable of establishing a sufficient chemical and/or physical connection between the metal and the rubber. Such a coupling agent, which is consequently at least bifunctional, has, for example, the simplified general formula "Y-T-X", in which:

Y represents a functional group (function "Y") which is capable of bonding physically and/or chemically to the metal, such a bond being able to be established, for example, between a silicon atom of the coupling agent and the surface oxides or hydroxides of the metal in question (in this case, aluminum);

X represents a functional group (function "X") which is capable of bonding physically and/or chemically to the rubber composition, for example to the diene elastomer, by means of a sulphur atom, or alternatively to a resin present in this composition by means of an aminated function;

T represents an organic group making it possible to link Y and X.

The polyfunctional organosilanes intended to provide adhesion between textile or metallic reinforcing members and polymers such as rubber are well-known to the person skilled in the art and have been described in numerous documents (see for example, in the field of tires, U.S. Pat. No. 4,052,524, U.S. Pat. No. 4,441,946, EP-A-0 738 748, EP-A-0 802 217, WO00/23504 and WO00/23505).

Without the definition below being limitative, the organosilane used has the preferred formula:

in which:
R represents an organic radical bearing at least one function (function X above) liable to react with at least one constituent of the rubber matrix;

each OR' (function Y above) represents a functional group liable to react with an aluminum oxide or hydroxide;
each R" represents, independently, hydrogen, a halogen or a cyclic, acyclic or aromatic organic radical;
a=0, 1 or 2.

The general formula above covers in particular the cases in which the radical R contains not only the aforementioned function X but also at least one second function Y (identical or not identical to the first), as is the case, for example, for symmetrical bis-alkoxysilanes of the polysulphide type.

The radical R preferably bears a hydroxyalkyl, an aminoalkyl, a polyaminoalkyl, an epoxyalkyl, in particular a glycidylalkyl, a haloalkyl, a mercaptoalkyl, an alkylsulphide or an alkylpolysulphide which may contain a silicon atom, an azidoalkyl, a cyclic or acyclic radical comprising at least one double ethylene bond, preferably an activated double ethylene bond.

It will be recalled that, in known manner, an "activated" bond is a bond which has been rendered more likely to react, in this case, here, with the diene elastomer. The ethylene double bond (>C=C<) of the radical R is preferably activated by the presence of an adjacent electron-attracting group, that is to say one fixed to one of the two carbon atoms of the ethylene double bond, this electron-attracting or "activating" group being selected in particular from among those bearing at least one of the bonds C=O, C=C, C—C, OH, O-alkyl or O-aryl, or at least one atom of sulphur and/or nitrogen, or at least one halogen. By definition, an "electron-attracting" group is a radical or functional group which is able to attract the electrons to itself more than a hydrogen atom would if it occupied the same position in the molecule in question.

The radicals R', which may be identical or different if they are several in number (a=0 or 1), are in particular selected from among hydrogen or an organic or organometallic, cyclic or acyclic radical; when R' is an organometallic radical, it preferably comprises at least one silicon atom. Each R' is preferably, independently, hydrogen, an alkyl having 1 to 6 carbon atoms, an organometallic radical comprising from 1 to 6 carbon atoms and at least one silicon atom.

The radicals R", which may be identical or different if they are several in number (a=2), are preferably selected from among alkyls having from 1 to 6 carbon atoms, for example the radicals methyl and/or ethyl.

The starting organosilane is preferably selected from among the group consisting of amino-$(C_1$-$C_6)$alkyl-$(C_1$-$C_6)$alkoxysilanes, acryloxy-$(C_1$-$C_6)$alkyl-$(C_1$-$C_6)$alkoxysilanes, methacryloxy-$(C_1$-$C_6)$alkyl-$(C_1$-$C_6)$alkoxysilanes, glycidoxy-$(C_1$-$C_6)$alkyl-$(C_1$-$C_6)$alkoxysilanes, mercapto-$(C_1$-$C_6)$alkyl-$(C_1$-$C_6)$alkoxysilanes, di- or polysulphides of $(C_1$-$C_{20})$ alkyl-$(C_1$-$C_6)$alkoxysilanes, maleimido-$(C_1$-$C_6)$alkyl-$(C_1$-$C_6)$alkoxysilanes, somaleimido-$(C_1$-$C_6)$alkyl-$(C_1$-$C_6)$ alkoxysilanes, N-[$(C_1$-$C_6)$alkyl$(C_1$-$C_6)$alkoxysilyl] maleamic acids, or a mixture of these compounds.

Specific examples of such silanes usable in the adhesive interphase of the composites according to the invention are 3-aminopropyl-triethoxysilane, 3-methacryloxypropyl-trimethoxysilane, 3-glycidoxypropyl-trimethoxysilane, 3-mercaptopropyl-trimethoxysilane, N-beta-aminoethyl-3-aminopropyl-trimethoxysilane, 3-aminopropyl-trimethoxysilane, 3-aminoethyl-triethoxysilane, 3-methacryloxypropyl-triethoxysilane, 3-glycidoxyethyl-triethoxysilane, 3-mercaptopropyl-triethoxysilane, N-beta-aminoethyl-3-aminoethyl-trimethoxysilane, 3-aminobutyl-triethoxysilane, 3-aminoethyl-trimethoxysilane, 3-aminopropyl-methyl-diethoxysilane, bis-triethoxysilylpropyl tetrasulphide, bis-trimethoxysilylpropyl tetrasulphide, 3-maleimidopropyltriethoxysilane and (N-propyltriethoxysilyl) maleamic acid.

Other specific examples of organosilanes are also p-(trimethoxysilyl) benzyldiazoacetate, 4-(trimethoxysilyl)cyclohexylsulphonyl azide, 6-(trimethoxysilyl)hexylsulphonyl azide.

The silane is more preferably selected from among the group consisting of 3-aminopropyl-triethoxysilane, N-beta-aminoethyl-3-aminopropyl-trimethoxysilane, 3-glycidoxypropyl-trimethoxysilane, 3-mercaptopropyl-trimethoxysilane, 3-aminopropyl-methyl-diethoxysilane, 3-maleimidopropyltriethoxysilane, bis-triethoxysilylpropyl tetrasulphide, and mixtures of these organosilanes.

Advantageously, an amino-($C_1$-$C_6$)alkyl($C_1$-$C_6$)alkoxysilane, in particular 3-amino-propyl-triethoxysilane, or a maleimido-($C_1$-$C_6$)alkyl-($C_1$-$C_6$)alkoxysilane, in particular 3-maleimidopropyltriethoxysilane, is used.

Of course, a single organosilane or a mixture of organosilanes may be used.

The organosilane is preferably deposited directly on the carbon steel reinforcing member coated with its intermediate layer of aluminum oxides or hydroxides. This deposition can be effected by any known process, discontinuously or continuously, for example by application with a brush, by dipping or by spraying, the organosilane being used pure, diluted in a solvent or in suspension in water.

If the silane selected is used in solution, for example in a mixture of water and alcohol, the concentration of the silane in the solution is preferably between 0.05% and 15%, more preferably between 0.1% and 10% (% by weight).

Before contact with the organosilane, the surface of the reinforcing member, coated with its intermediate metallic layer, may first be cleaned and/or activated in various ways known in the art, for example by washing with hot water, by treatment with an acidic or basic aqueous solution, with possible intermediate rinsing and drying stages, or alternatively by plasma treatment.

By way of indication, the organosilane layer thus deposited represents preferably less than 50 mg, more preferably less than 5 mg, of silane per 100 g of reinforcing member, which is equivalent to a thickness generally of between 10 and 100 nm (nanometers), depending on the type of process used for deposition.

After application of the silane, the surface of the reinforcing member may be dried, for example in ambient air, or preferably heat-treated, by heating in an oven or a tunnel, the heating being for example obtained by conduction in contact with hot gas, or electrically, in particular by Joule effect or by induction.

This heat treatment permits starting with the possible solvent(s), and also the reaction, which is partial or total depending on the intensity of the treatment, of the organosilane with the aluminum oxides or hydroxides, that is to say the formation of a three-dimensional surface lattice of $\equiv$Si—OR' or $\equiv$Si—OH condensed with the aluminum oxides-hydroxides, this surface lattice being intended to adhere later to the rubber matrix.

II-4. Composite of the Invention

The metallic reinforcing member thus prepared can be placed directly in contact with the rubber composition, in order to manufacture the composite of the invention.

This composite may be present in varied forms, for example in the form of a ply, a band, strip or a block of rubber in which there is incorporated the metallic reinforcing member using different means known to the person skilled in the art, such as for example moulding, calendering or extrusion means.

Of course, the invention relates to the composites in the uncured state (i.e. before curing or cross-linking) and in the cured state (i.e. after cross-linking). In this composite, the definitive adhesion between the metal and the rubber composition, via the adhesive interphase, is obtained on emerging from the curing (vulcanization) of the finished article, for example the tire, comprising the composite. Preferably, this curing is effected under pressure.

The composites according to the invention are preferably intended for tires, in particular radial tires, to form all or part of the crown reinforcement, the carcass reinforcement or the reinforcement of the bead zone of such tires.

Figure 1:
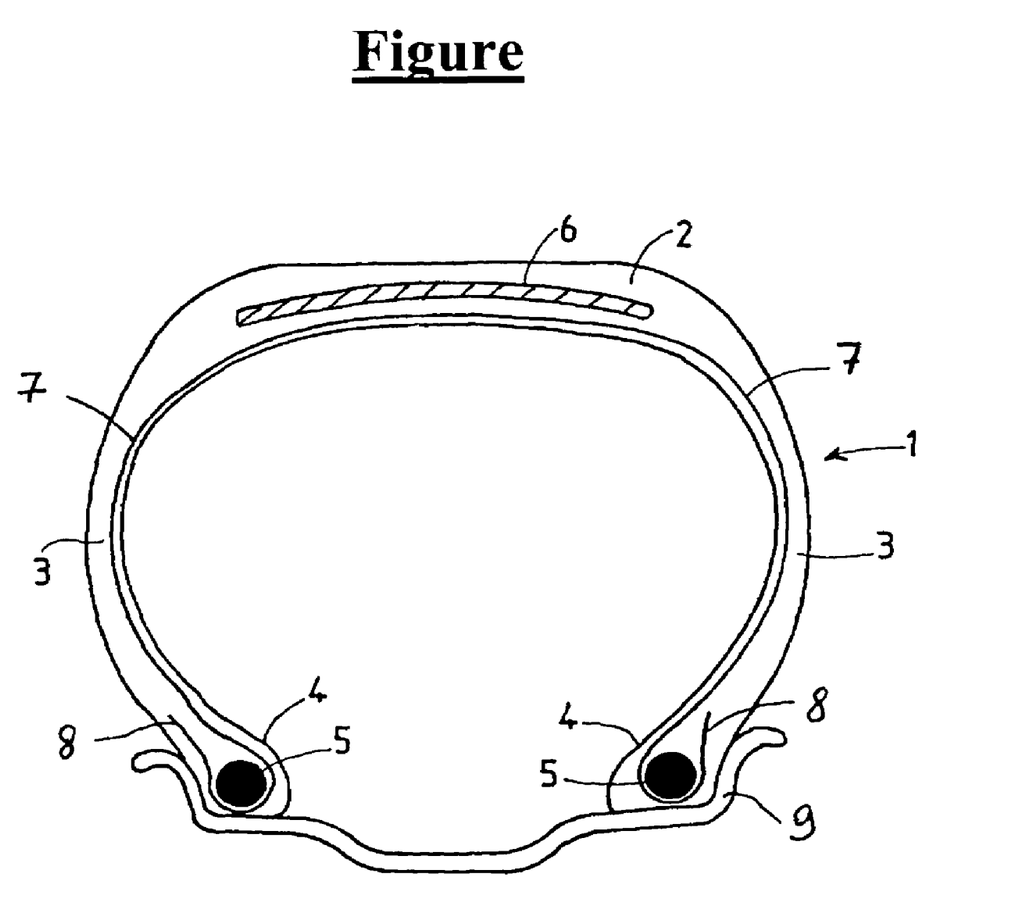
FIG. 1 shows a radial section through a heavy-vehicle tire having a radial carcass reinforcement.

By way of example, the appended figure shows diagrammatically a radial section through a heavy-vehicle (truck) tire 1 having a radial carcass reinforcement which may or may not be in accordance with the invention, in this general representation. This tire 1 comprises a crown 2, two sidewalls 3, two beads 4 and a carcass reinforcement 7 extending from one bead to the other. The crown 2, which is surmounted by a tread (not shown in this diagram, for purposes of simplification) is in known manner reinforced by a crown reinforcement 6 formed for example of at least two superposed crossed crown plies, possibly covered by at least one protective crown ply, all these plies possibly being reinforced by metal cables. The carcass reinforcement 7 is wound around the two bead cores 5 within each bead 4, the upturn 8 of this reinforcement 7 being for example arranged towards the outside of the tire 1, which is shown here mounted on its rim 9. The carcass reinforcement 7 is formed of at least one ply reinforced by so-called "radial" metal cables, that is to say that these cables are arranged practically parallel to each other and extend from one bead to the other so as to form an angle of between 80° and 90° with the median circumferential plane (plane perpendicular to the axis of rotation of the tire which is located halfway between the two beads 4 and passes through the centre of the crown reinforcement 6).

The tire according to the invention has the essential characteristic of comprising in its structure at least one (metal/rubber) composite according to the invention, this composite possibly being, for example, part of the bead zone 4 comprising the bead core 5, a crossed crown ply or a protective ply for the crown reinforcement 6, a ply forming all or part of the carcass reinforcement 7.

As indicated previously, the composite of the invention is advantageously usable to form a carcass reinforcement ply 7 for a tire for an industrial vehicle such as a truck vehicle. Preferably, in such a case, its rubber composition represents, in the vulcanized state (i.e. after curing), a secant tensile modulus E10 which is less than 9 MPa, more preferably of between 4 and 9 MPa.

However, the composite of the invention may have a use which is equally advantageous in crown reinforcements for all types of tires, for example for passenger vehicles, vans or heavy vehicles. Preferably, in such a case, its rubber composition has, in the vulcanized state, a modulus E10 which is greater than 9 MPa, more preferably of between 9 and 20 MPa.

It is in the ranges of moduli E10 indicated above that the best compromise of endurance were recorded on the composites of the invention on one hand, and the tires reinforced with these composites on the other hand.

III. EXAMPLES OF EMBODIMENT OF THE INVENTION

Unless indicated otherwise, in the tests which follow, all the data relating to the formulations of the rubber or metal compositions are parts by weight.

II-1. Nature and Properties of the Reinforcing Members Used

To produce the examples of composites whether or not in accordance with the invention, there are used as metallic reinforcing members either cables formed of fine wires of carbon steel, whether coated or not, the structure or geometry of these cables being in particular usable for the reinforcement of carcass reinforcements for heavy-vehicle tires or crown reinforcements for passenger-car tires, or elementary wires of large diameter usable for reinforcement of the bottom zones of tires, in particular in the form of bead cores.

The fine wires of carbon steel are prepared starting, for example, from wire rods (diameter 5 to 6 mm) which are first of all work-hardened, by rolling and/or drawing, to an intermediate diameter close to 1 mm, or alternatively starting directly from commercial intermediate wires, the diameter of which is close to 1 mm. The steel used is a known carbon steel, for example of the type USA AISI 1069, the carbon content of which is approx. 0.7%, comprising approximately 0.5% manganese and 0.2% silicon, the remainder being formed of iron and the usual inevitable impurities linked to the manufacturing process for the steel. The wires of intermediate diameter then undergo a degreasing and/or pickling treatment, before their subsequent transformation. After possible deposition of a metallic coating on these intermediate wires (for example, brass, zinc or aluminum alloy, in accordance with the following examples), then so-called "final" work-hardening is effected on each wire (i.e. implemented after the final heat treatment of patenting), by cold-drawing in a wet medium with a drawing lubricant which is for example in the form of an aqueous emulsion.

The elementary wires of greater diameter (bead wires) are prepared directly starting from these wires of intermediate diameter, treated (degreasing and/or pickling), without a work-hardening operation being necessary.

The cables used are layered cables of known structure [3+9] or [1+6], formed in total, respectively, of 12 or 7 wires of a diameter of approximately 0.225 mm.

The cables of non-wrapped structure [3+9] comprise a core of 3 wires wound together in a helix (S direction) in a pitch of 6.3 mm, this core being surrounded by and in contact with a layer of 9 wires which themselves are wound together in a helix (S direction) around the core in a pitch of 12.5 mm.

The cables of non-wrapped structure [1+6] comprise a core formed of a single wire surrounded by and in contact with a layer of 6 wires wound together in a helix (S direction) around the core, in a pitch of 12.5 mm.

More precisely, the cables or wires used have the following characteristics:

reinforcing members "R-1": these are [3+9] control cables formed of conventional brass-coated wires (electrolytic deposition); the brass used contains 68% copper, and may be used for gluing to rubber compositions devoid of cobalt compounds; the brass coating has a very low thickness, significantly less than one micrometer, which is equivalent to approximately 350 to 400 mg of brass per 100 g of wire;

reinforcing members "R-2": these are other [3+9] control cables formed of wires the brass layer of which has been replaced by a layer of aluminum-zinc alloy (approximately 5% by weight aluminum); the thickness of the coating of alloy, deposited "by dipping" before final wet drawing, is of the order of one micrometer after drawing (or approximately 1.6 g of aluminum alloy per 100 g of wire); such wires and cables are known, described for example in the aforementioned application WO91/01389;

reinforcing members "R-3": other [3+9] control cables formed of wires of "bright" steel (i.e. without metallic coating), these cables being coated with a single ultra-thin organosilane film (estimated at less than 5 mg of silane per 100 g of wire);

reinforcing members "R-4": these are [3+9] cables intended for the composites according to the invention; each carbon steel wire is coated with an intermediate layer of aluminum-zinc alloy, identical to that of the wires of the cables R-2, these cables themselves being coated with an organosilane film identical to that of the cables R-3;

reinforcing members "R-5": other [3+9] control cables formed of conventional brass-coated wires (electrolytic deposition); the brass used contains 68% copper, as for the cables R-1; the brass coating has a very low thickness, which is equivalent to approximately 250 mg of brass per 100 g of wire;

reinforcing members "R-6": [3+9] control cables identical to the cables R-5, with the exception of an additional organosilane film (identical to that of cables R-3 and R-4) deposited on the surface of the brass;

reinforcing members "R-7": [3+9] control cables formed of wires of bright steel, the cables being coated with a single organosilane film (as for the cables R-3);

reinforcing members "R-8": [3+9] cables intended for the composites according to the invention; each carbon steel wire is coated with an intermediate layer of aluminum-zinc alloy (approximately 10% by weight aluminum); the thickness of the coating of alloy, deposited "by dipping" before final wet drawing, is of the order of two micrometers after drawing (or approximately 3 g of aluminum alloy per 100 g of wire); these cables are furthermore coated with an organosilane film (identical to that of cables R-4 or R-6);

reinforcing members "R-9": these are elementary wires (wires for bead cores) of large diameter (approximately 0.95 mm); the brass used contains 64% copper; the brass coating has a very low thickness, of the order of 10 micrometers, which is equivalent to approximately 5 g of brass per 100 g of wire;

reinforcing members "R-10": bead wires as described above; the brass layer has been replaced by a layer of zinc of a thickness of approximately 15 μm, which is equivalent to approximately 6 g of zinc per 100 g of wire; these wires R-10 are furthermore coated with an organosilane film;

reinforcing members "R-11": bead wires intended for the composites according to the invention; the brass layer has been replaced by a layer of aluminum-zinc alloy (10% Al), which itself is coated with an organosilane film; the layer of alloy has a thickness of approximately 20 μm, which is equivalent to approximately 7 g of alloy per 100 g of wire;

reinforcing members "R-12": [3+9] control cables formed of conventional brass-coated wires (electrolytic deposition—brass containing 64% copper);

reinforcing members "R-13": [3+9] control cables like the cables R-12 above, the brass layer having been replaced by a layer of zinc of a thickness of approximately 1.5 μm, which is equivalent to approximately 2.4 g of zinc per 100 g of wire; these cables are furthermore coated with an organosilane film identical to that of cables R-3 or R-4;

reinforcing members "R-14": non-wrapped [1+6] control layered cables, formed of 7 wires of a diameter of approximately 0.225 mm, one wire serving as a core and the other six wound together in a helix around the core in a pitch of 12.5 mm; the wires are conventional brass-coated carbon steel wires, prepared as indicated previously for the reinforcing members R-1;

reinforcing members "R-15": these [1+6] cables, which are intended for the composites according to the invention, are identical to the cables R-14 except that the brass is replaced by a layer of Al—Zn alloy which itself is coated with an organosilane film (as indicated for the reinforcing members R-4).

Only the reinforcing members R-4, R-8, R-11 and R15 are therefore in accordance with the invention.

For the silanisation of the silanised reinforcing members (R-3, R-4, R-6, R-7, R-8, R-10, R-11, R-13, R-15), 3-aminopropyl-triethoxysilane (general case) or 3-maleimidopropyl-triethoxysilane (case of reinforcing members R-7 and R-8) was used, by proceeding in the following manner: the reinforcing member is first of all treated by passing into a bath of hot water at 50° C. (dwell time: approximately 10 seconds); then the reinforcing member is introduced into the bath of silane at 20° C. containing (% by volume): 1% silane, 10% eau and 89% ethanol (dwell time: approximately 30 seconds); after application of the silane, the surface of the reinforcing member is dried by passing into a heating tunnel at a temperature of 175° C. for 90 seconds.

The different reinforcing members, before incorporation in the rubber matrices for which they are intended, have the mechanical properties indicated in the attached Table 1.

In known manner, the elongation At is the total elongation recorded upon breaking of the reinforcing member, that is to say integrating both the elastic part of the elongation (Hooke's law) and the plastic part of the elongation to which are added, in the case of a cable, what is called the structural part of the elongation inherent in the specific geometry of the cable tested.

III-2. Adhesion Tests

In the adhesion tests three compositions or rubber matrices, M-1 to M-3, based on natural rubber and carbon black, are used. The appended Table 2 shows their precise formulation in phr (parts by weight per hundred parts of elastomer). In addition to the conventional ingredients (extender oil, antioxidant, zinc oxide, stearic acid, sulphur and vulcanization accelerator), the matrix M-1 contains resorcinol and a hardener (HMT); the matrix M-2 contains a bismaleimide; the matrix M-3 contains neither resorcinol nor bismaleimide. There is furthermore used, in the three cases, a small quantity of silica (5 phr). These three rubber compositions are devoid of adhesion promoter of the cobalt salt type.

Starting from these 3 rubber matrices and the reinforcing members R-1 to R-13 previously described, a total of 30 (carbon steel/rubber) composites, C-1 to C-30, are prepared in accordance with the details in the appended Table 3. These composites C-1 to C-30 are in the form of the rubber blocks intended for the adhesion tests described in section I-3 above.

A) Test 1

The aim of this first test is to compare the adhesive performance of composites C-1 and C-2 subjected to the conditions of "wet ageing" or "wet and corrosive ageing" as described in section I-2. The composite C-1 is the control provided with the conventional adhesive interphase (brass); the composite C-2 is the one in accordance with the invention. The rubber matrix is the matrix M-1 previously described comprising in particular resorcinol, HMT and silica.

First of all different samples of these two composites are subjected to a kinetic ageing study, under conditions of "wet ageing" (see section 1-2), for 17 weeks, by measuring the initial tearing force "Fa" (non-aged composites), after 5 weeks' ageing, then every 3 weeks until maximum ageing of 17 weeks.

The results obtained are summarised in the appended Table 4, in relative units (r.u.), the base 100 being used for the initial tearing force recorded on the control composite (brass).

The starting level of adhesion is very high, with an average initial tearing force of the order of 90 daN (base 100) in both cases. After 5 weeks' ageing, the tearing force of the control composite is reduced by approximately 10%, then, beyond that, drops rapidly to reach a final residual level which represents no more than approximately one third of the initial performance. On the other hand, for the composite according to the invention, it will be noted that the tearing force Fa unexpectedly is not subject to any deterioration (except for the accuracy of measurement) even after prolonged ageing of 17 weeks.

Furthermore, other samples of these two composites C-1 and C-2 are subjected to the conditions of "wet and corrosive ageing" set forth in section 1-2, that is to say that after 3 weeks' wet ageing the composites are subjected to an additional 4 days' ageing under extremely corrosive conditions. It will then be noted that the level of adhesion drops very greatly on the control composite, practically by a factor of 10 (residual Fa equal to 9.6, in r.u.), whereas the adhesion is not affected on the composite according to the invention (residual Fa equal to 99, in r.u.).

This test therefore demonstrates an excellent adhesive performance of the composite according to the invention after wet or corrosive ageing, significantly greater than that of the control composite.

B) Test 2

The aim of this test is to compare the composites C-3 to C-5, both in the initial state and after "wet and corrosive ageing" (section I-2). Composite C-3 is the control provided with the conventional adhesive interphase (brass); composite C-4 is the control comprising the silane film alone as adhesive interphase; composite C-5 is the one in accordance with the invention. The rubber matrix (M–1) is identical to that of the preceding test.

The results of the appended Table 5 are obtained, in which the base 100 has been used for the initial adhesive level (before ageing) recorded on the control composite (brass).

These results confirm those of Test 1 above. It will be noted first of all that the initial levels of adhesion are identical for composites C-3 and C-5, slightly greater than those of composite C-4. But it will be noted above all that the conventional composite (brass) C-3 withstands the conditions of the ageing test poorly (drop in Fa of 90%), the composite according to the invention C-5 for its part appearing not to be sensitive to ageing. As for the composite C-4 using the organosilane film alone as adhesive interphase, it exhibits an intermediate performance, which is nevertheless very inferior to that of the composite according to the invention.

C) Test 3

Here the composites C-6 to C-8 are compared. The composite C-6 is the control provided with the conventional adhesive interphase (brass); the composite C-7 is the control comprising the silane film alone as adhesive interphase; the composite C-8 is the one in accordance with the invention. The rubber matrix is the matrix M-2 comprising in particular a bismaleimide.

First of all the composites are subjected to the "wet and corrosive ageing" test performed in accordance with section I-2. Then the results of the appended Table 6 are obtained, the base 100 being used for the initial level of adhesion recorded on the control composite (brass).

These results entirely confirm those of Tests 1 and 2 above. It will be noted first of all that the initial levels of adhesion are identical between composite C-6 (brass) and the composite according to the invention C-8, and greater than those of composite C-7. The conventional composite (brass) resists the ageing test poorly (drop in adhesion of 84%), whereas the composite of the invention C-8 appears to be comparatively insensitive to ageing, with a very slight drop in adhesion (only 12%). As for the composite C-7 (silane alone), although superior to the control C-6, it reveals a performance which is significantly inferior to that of the composite of the invention.

Thus, with a different rubber matrix, the superiority of the composite of the invention over the control composites is confirmed.

On the other hand, other samples of these three composites C-6 to C-8 are subjected to the conditions of "corrosive ageing" described in section 1-2, for a total duration of 14 days.

This time, the results of the appended Table 7 are observed (the base 100 used for the control composite C-6 (brass), before ageing).

Under these extremely corrosive ageing conditions, once again a distinct superiority of the composite according to the invention will be noted: the level of adhesion drops by approximately ⅔ for the two control composites, whereas it only drops by approximately 50% for the composite of the invention.

D) Test 4

Here the composites C-9 to C-12 are compared, in terms of initial adhesion, that is to say before any ageing. These composites C-9 and C-11 are two controls, not in accordance with the invention, the adhesive interphase of which is admittedly formed of a layer of aluminum-zinc alloy but is devoid of organosilane film, unlike the composites C-10 and C-12 according to the invention. The rubber matrices tested are the matrices M-1 (based on resorcinol and HMT hardener) and M-2 (based on bismaleimide).

The initial adhesion measured is indicated in Table 8: a base 100 was used for the composite according to the invention C-10 having exhibited the highest initial adhesion (Fa equal to approximately 90 daN), which is furthermore identical to that of the reference control composite C-1 (brass) tested during Test 1.

It will be noted that the control composites C-9 and C-11 exhibit a distinctly insufficient adhesion whatever the rubber matrix, in particular for the matrix M-2.

The two composites according to the invention C-10 and C-12 on the other hand exhibit a very high level of adhesion, which is furthermore virtually identical.

This test thus clearly shows that the sole presence of aluminum oxides-hydroxides at the surface of the carbon steel is very distinctly insufficient, in the absence of the organosilane film, to obtain the levels of initial adhesion usually expected.

E) Test 5

The aim of this test is to compare 6 new composites C-13 to C-18 (see details in Table 3), comprising reinforcing members (R-5, R-6 and R-8) which are different from those previously tested, both in the initial state and after "wet and corrosive ageing".

The composites C-13 and C-16 are the two reference controls, provided with the conventional adhesive interphase (brass). The control composites C-14 and C-17 furthermore comprise a silane film on the surface of the brass. The composites C-15 and C-18 are the only ones in accordance with the invention. The rubber matrices tested are the matrices M-1 and M-2.

Table 9 gives the levels of initial adhesion and after ageing. The base 100 was used for the initial level of adhesion recorded on each of the composites tested (Fa equal to approximately 90 daN for each of them).

As far as the adhesion after ageing is concerned, these results clearly confirm those of Test 1 above, namely that the conventional composites (brass) C-13 and C-16 resist ageing poorly (drop of more than 85% for Fa), whereas the composites of the invention C-15 and C-18 for their part appear to be not very sensitive to ageing, with a drop in Fa which remains less than 30%.

As for the control composites C-14 and C-17 using the organosilane film on the surface of the brass, they exhibit a performance which is at best intermediate (for C-14) or very poor (for C-17), but in any case very distinctly inferior to that of the composites according to the invention.

This test therefore clearly shows that, in terms of adhesion after ageing, the presence of a silane film on the surface of the brass results in a distinctly poorer performance than that offered by the composites according to the invention in which the layer of brass has been replaced by the layer of Al—Zn alloy bearing aluminum oxides-hydroxides.

F) Test 6

The adhesive performances of 3 new composites, C-19 to C-21, comprising the bead wires R-9 to R-11, are compared here, these composites being intended for reinforcing the bead zone of a passenger-car tire. These 3 composites are subjected to the "wet and corrosive ageing" test.

C-19 is the reference control since it is provided with the conventional adhesive interphase (brass). C-21 is the composite according to the invention. As for C-20, this is another control composite the adhesive interphase of which consists this time of a layer of zinc which is itself coated with the organosilane film. In other words, the composite according to the invention is distinguished from the control C-20 solely by the nature of the intermediate layer used: Zn for the control, Al—Zn alloy for the invention. The rubber matrix is the matrix M-3.

The results obtained are summarised in Table 10, the base 100 being used for the initial tearing force recorded on the control composite (brass). The starting level of adhesion is high, with an average initial tearing force of the order of 55 daN, the highest level furthermore being recorded on the composite of the invention.

After ageing, it will be noted that the adhesion drops by 80% on the two controls, whereas it remains greater than 50% of its initial value on the composite of the invention.

This test thus clearly shows that the presence, in the adhesive interphase, of aluminum oxides-hydroxides and not of oxides-hydroxides of any other metal, such as in particular zinc oxides-hydroxides, is a characteristic which is essential to the invention.

G) Test 7

Here 6 new composites, C-22 to C-27 (see details in Table 3) are prepared, comprising the reinforcing members R-5, R-7 and R-8, some of these composites being similar to those prepared and tested in Test 5.

The composites C-22 and C-25 are the two reference controls, provided with the conventional adhesive interphase (brass). In the other two controls C-23 and C-26, the brass has been replaced by an organosilane film, whereas in the composites C-24 and C-27 according to the invention, the brass has been replaced by an intermediate layer of Al—Zn alloy (10% Al) which itself is coated with the organosilane film. In other words, the composites according to the invention are distinguished from the controls C-23 and C-26 solely by the additional presence of the intermediate layer of Al—Zn alloy between the carbon steel substrate and the organosilane film. The rubber matrices tested are M-1 and M-2.

Table 11 gives the levels of initial adhesion and after wet and corrosive ageing, for each of the composites tested. The base 100 was used for the initial level of adhesion recorded on each of the composites (Fa equal to approximately 90 daN for each of them).

Whatever the rubber matrix used, the superiority of the invention is once again established: the drop in adhesion after ageing remains less than 30% in all cases, whereas this drop may reach close to 80 to 90% for the control composites.

It is thus clearly demonstrated that in terms of adhesion after ageing, the presence of merely a film of silane on the surface of the carbon steel results in distinctly insufficient performance, compared with that offered by the composites according to the invention.

H) Test 8

In this last adhesion test, 3 new composites C-28 to C-30 (see details in Table 3), reinforced with the cables R-12, R-13 and R-8, are compared.

The composite C-28 is the reference control provided with the conventional adhesive interphase (reinforcing member with brass layer).

In the composite C-29, which is not in accordance with the invention, the layer of brass has been replaced by a layer of zinc which itself is covered with the organosilane film. This adhesive interphase, formed of a layer of zinc coated with an organosilane film, is known and has been exemplified in particular in the aforementioned applications WO00/23504 and WO00/23505, with the aim of making a rubber matrix adhere to carbon steel wires coated specifically with zinc.

Finally, the composite C-30 is the composite according to the invention, which differs solely from the previous composite C-29 by a layer of aluminum alloy (Al—Zn containing 10% Al), instead of the layer of Zn.

Table 12 gives the levels of initial adhesion and after wet and corrosive ageing, for each of the composites tested. The base 100 was used for the initial level of adhesion recorded on each of the composites (Fa equal to approximately 90 daN, and therefore very high, for each of them).

It will be noted that the composite of the invention, once again, reveals a performance which is not only very distinctly improved compared with the conventional solution (composite C-28 with layer of brass), but also twice as high as the solution known from the prior art (composite C-29). Thus the superiority of the aluminum oxides-hydroxides over other metallic oxides-hydroxides such as zinc oxides-hydroxides is clearly demonstrated.

In summary, the adhesion tests of Tests 1 to 8 above all demonstrate, whatever the wet ageing and/or corrosive conditions used, that the composites according to the invention have after ageing an adhesive performance which is distinctly greater than that of the conventional composite comprising, as adhesive interphase, a layer of brass, while offering an initial level of adhesion which is very satisfactory since it is equivalent to that available on the conventional composite.

The composites of the invention furthermore exhibit a performance which is also improved compared with other known composites using a non-conventional adhesive interphase (other than brass), in particular a layer of zinc coated with an organosilane film.

III-3. Endurance Tests

All the above results were observed under static conditions of accelerated ageing. They must now face dynamic stress tests, which are closer to the real conditions of use in a tire; these are the "belt" tests and running tests in a tire.

A) Belt Test

The object of this test is to show the increase in fatigue strength of the composites according to the invention, after the laboratory fatigue test referred to as the "belt test" described in section I-3 above.

For this test, two composites in the form of the belts described in section I-3 are prepared. The control composite contains the conventional brass-coated reinforcing member R-1, while the composite according to the invention contains the reinforcing member R-4. The rubber matrix used is a known rubber composition, based on natural rubber and reinforced with carbon black, typically used in the carcass reinforcements of heavy-vehicle tires.

After extracting the cables from the belts, as indicated in section I-3, the initial breaking load (before fatigue) and the residual breaking load (after fatigue) is measured for each type of wire (average values of 5 measurements), according to the position of the wire in the cable, and for each of the cables tested.

The degeneration ΔFm observed is given in % in the appended Table 13, both for the 3 wires of the core (level marked N1) and for the 9 wires of the outer layer (level marked N2). The overall degenerations ΔFm are also measured on the cables themselves, that is to say, not on the wires taken individually.

On reading Table 13, it will be noted that the degeneration of the wires present in the belt according to the invention is distinctly reduced (on average 40% less) compared with that of the wires present in the control belt, and this whatever the level in question (N1 or N2); this improvement on each layer has an effect on the performance and the endurance of the cable itself (overall degeneration ΔFm of 5.5%, practically twice as little as that of the control cable) and therefore on the composite which contains it.

Correlatively to these results, microscope examination of the various wires shows that the phenomena of wear which result from repeated friction of the wires on each other, are substantially reduced for the cables extracted from the belt according to the invention.

B) Endurance in the Tire

This new test confirms the previous observations and demonstrates that the use of a (metal/rubber) composite according to the invention makes it possible to increase significantly the longevity of a carcass reinforcement of a radial tire, after accelerated wet ageing.

For this test, there are prepared in known manner, by calendering, two series of composites in the form of carcass reinforcement plies for a radial tire such as described in section II-4, each ply being reinforced by radial cables of carbon steel, arranged parallel in a density of approximately 90 cables par dm (decimeter) of ply. The rubber matrix is a known composition, based on natural rubber and reinforced with carbon black, conventionally used for the manufacture of tires (modulus E10 equal to approximately 6.5 MPa, after curing); this composition essentially comprises, in addition to the diene elastomer and the reinforcing filler, an antioxidant, an extender oil, cobalt naphthenate as adhesion promoter, stearic acid, zinc oxide, sulphur and a vulcanization accelerator.

Two series of tires, P-1 and P-2, are produced with these reinforcing members, the carcass reinforcement 7 (see figure) of these tires being formed of a single radial ply formed of the above rubberised fabric, reinforced respectively by the reinforcing members R-14 and R-15. These tires are therefore identical with the exception of the composites which form their carcass reinforcement, the tires P-1 constituting the control series of this test, and the tires P-2 the series according to the invention.

These tires are mounted on identical known rims and are inflated to the same pressure (excess pressure) with air saturated with moisture. These tires are then made to travel on an automatic running machine, under the same excess load and at the same speed, until the carcass reinforcement of at least one of the tires tested breaks.

It will then be noted that, under these very severe conditions of accelerated wet ageing, the tires P-2 according to the invention withstand the running test distinctly better, covering a distance which is two to three times greater, depending on the cases, than that covered by the control tires P-1. It will furthermore be noted that the number of cables broken after running is very low in the tires P-2 according to the invention, representing less than 10% of the number of cables broken in the tires P-1 of the prior art.

Tensile tests and microscope observations performed on the wires of the cables extracted from the two series of tires, after the running test, furthermore demonstrate that the average degeneration of the breaking load of these wires, and their wear, are distinctly less in the case of the composites according to the invention.

In conclusion, compared with the conventional composites based on brass-coated wires, the composites of the invention have a (metal/rubber) adhesive interphase which offers an initial level of adhesion which is at least as good, with performances which are very distinctly improved after ageing of the wet and/or corrosive type.

Thus, the longevity of the tires can be substantially improved, in particular that of the tires for industrial vehicles comprising conventionally metallic carcass reinforcements subjected to particularly severe running conditions, in particular in a wet, corrosive atmosphere.

TABLE 1

| Reinforcing member | Fm (N) | At (%) | Rm (MPa) |
|---|---|---|---|
| R-1 | 1340 | 2.6 | 2815 |
| R-2 | 1350 | 2.3 | 2825 |
| R-3 | 1345 | 2.4 | 2820 |
| R-4 | 1350 | 2.2 | 2825 |
| R-5 | 1335 | 2.5 | 2830 |
| R-6 | 1340 | 2.3 | 2815 |
| R-7 | 1350 | 2.4 | 2825 |
| R-8 | 1350 | 2.5 | 2820 |
| R-9 | 740 | 7.4 | 1035 |
| R-10 | 830 | 8.7 | 1105 |
| R-11 | 800 | 1.8 | 1100 |
| R-12 | 635 | 1.9 | 2700 |
| R-13 | 670 | 2.1 | 2825 |
| R-14 | 780 | 2.3 | 2830 |
| R-15 | 785 | 2.4 | 2840 |

TABLE 2

| Rubber composition: | M-1 | M-2 | M-3 |
|---|---|---|---|
| diene elastomer (1) | 100 | 100 | 100 |
| carbon black (2) | 66 | 66 | 66 |
| antioxidant (3) | 2.2 | 2.2 | 2.2 |
| extender oil | 2 | 2 | 2 |
| zinc oxide | 7.5 | 7.5 | 7.5 |
| stearic acid | 0.6 | 0.6 | 0.6 |
| methylene acceptor (4) | 1 | — | — |
| bismaleimide (5) | — | 3 | — |
| methylene donor (6) | 0.4 | — | — |
| silica (7) | 5 | 5 | 5 |
| sulphur | 6 | 4.5 | 4.5 |
| sulphenamide (8) | 0.7 | 0.7 | 0.7 |

(1) natural rubber;
(2) N326 (name in accordance with Standard ASTM D-1765);
(3) N-(1,3-dimethylbutyl)-N'-phenyl-p-phenylenediamine; ("Santoflex 6-PPD" from Flexsys);
(4) resorcinol (from Sumitomo);
(5) N,N'-(m-phenylene)-bismaleimide ("HVA2" - from Du Pont de Nemours);
(6) HMT (hexamethylenetetramine - from Degussa);
(7) Silica ("Zeosil 1165MP" from Rhodia);
(8) N-dicyclohexyl-2-benzothiazol-sulphenamide ("Santocure CBS" from Flexsys).

TABLE 3

| Composite | Matrix | Reinforcing member |
|---|---|---|
| C-1 | M-1 | R-1 |
| C-2 | M-1 | R-4 |
| C-3 | M-1 | R-1 |
| C-4 | M-1 | R-3 |
| C-5 | M-1 | R-4 |
| C-6 | M-2 | R-1 |
| C-7 | M-2 | R-3 |
| C-8 | M-2 | R-4 |
| C-9 | M-1 | R-2 |
| C-10 | M-1 | R-4 |
| C-11 | M-2 | R-2 |
| C-12 | M-2 | R-4 |
| C-13 | M-1 | R-5 |
| C-14 | M-1 | R-6 |
| C-15 | M-1 | R-8 |
| C-16 | M-2 | R-5 |
| C-17 | M-2 | R-6 |
| C-18 | M-2 | R-8 |
| C-19 | M-3 | R-9 |
| C-20 | M-3 | R-10 |
| C-21 | M-3 | R-11 |
| C-22 | M-1 | R-5 |
| C-23 | M-1 | R-7 |
| C-24 | M-1 | R-8 |
| C-25 | M-2 | R-5 |
| C-26 | M-2 | R-7 |
| C-27 | M-2 | R-8 |
| C-28 | M-2 | R-12 |
| C-29 | M-2 | R-13 |
| C-30 | M-2 | R-8 |

TABLE 4

| Fa (r.u.) after: | 0 wks | 5 wks | 8 wks | 11 wks | 14 wks | 17 wks |
|---|---|---|---|---|---|---|
| C-1 | 100 | 89 | 42 | 39 | 35 | 34 |
| C-2 | 100 | 102 | 99 | 100 | 101 | 98 |

TABLE 5

| Composite | Fa (r.u.) in the initial state | Fa (r.u.) after ageing |
| --- | --- | --- |
| C-3 | 100 | 10 |
| C-4 | 95.5 | 50 |
| C-5 | 101 | 100 |

TABLE 6

| Composite | Fa (r.u.) in the initial state | Fa (r.u.) after ageing |
| --- | --- | --- |
| C-6 | 100 | 16 |
| C-7 | 94.7 | 29 |
| C-8 | 100 | 88 |

TABLE 7

| Composite | Fa (r.u.) in the initial state | Fa (r.u.) after ageing |
| --- | --- | --- |
| C-6 | 100 | 35 |
| C-7 | 93.8 | 33 |
| C-8 | 101 | 52 |

TABLE 8

| Composite | Fa (r.u.) in the initial state |
| --- | --- |
| C-9 | 45 |
| C-10 | 100 |
| C-11 | 15 |
| C-12 | 97 |

TABLE 9

| Composite | Fa (r.u.) in the initial state | Fa (r.u.) after ageing |
| --- | --- | --- |
| C-13 | 100 | 9 |
| C-14 | 100 | 39 |
| C-15 | 100 | 72 |
| C-16 | 100 | 13 |
| C-17 | 100 | 14 |
| C-18 | 100 | 91 |

TABLE 10

| Composite | Fa (r.u.) in the initial state | Fa (r.u.) after ageing |
| --- | --- | --- |
| C-19 | 100 | 20 |
| C-20 | 104 | 20 |
| C-21 | 111 | 53 |

TABLE 11

| Composite | Fa (r.u.) in the initial state | Fa (r.u.) after ageing |
| --- | --- | --- |
| C-22 | 100 | 9 |
| C-23 | 100 | 32 |
| C-24 | 100 | 74 |
| C-25 | 100 | 18 |

TABLE 11-continued

| Composite | Fa (r.u.) in the initial state | Fa (r.u.) after ageing |
| --- | --- | --- |
| C-26 | 100 | 17 |
| C-27 | 100 | 72 |

TABLE 12

| Composite | Fa (r.u.) in the initial state | Fa (r.u.) after ageing |
| --- | --- | --- |
| C-28 | 100 | 8 |
| C-29 | 100 | 43 |
| C-30 | 100 | 83 |

TABLE 13

| ΔFm (%) | N1 | N2 | Cable |
| --- | --- | --- | --- |
| R-1 | 7.0 | 10.1 | 9.3 |
| R-4 | 3.9 | 6.0 | 5.5 |

The invention claimed is:

1. A metallic body comprising:
carbon steel covered with an adhesive layer adhered to a rubber matrix;
wherein the carbon content of the steel is between 0.35% and 1.20% by weight;
wherein the adhesive layer is formed of a metallic layer bearing aluminum oxides or hydroxides, which itself is covered with an organosilane film, as coupling agent for the bond bond between the aluminum oxides or hydroxides, and the rubber matrix;
wherein the rubber matrix is based on diene elastomer; and
wherein the organosilane film is in direct contact with the rubber matrix.

2. The metallic body according to claim 1, wherein said metallic body is selected from the group consisting of wires, assemblies of wires and films.

3. The metallic body according to claim 2, wherein the carbon steel has a carbon content of between 0.5% and 1.1% by weight.

4. The metallic body according to claim 1, wherein the metal of the intermediate layer is aluminum or an aluminum alloy.

5. The metallic body according to claim 1, wherein the organosilane coupling agent has the formula:

in which:
R represents an organic radical comprising a function able to react with a constituent of the rubber matrix;
each OR' represents a functional group able to react with an aluminum oxide or hydroxide;
each R" represents, independently, hydrogen, a halogen or a cyclic, acyclic or aromatic organic radical;
a=0, 1 or 2.

6. The metallic body according to claim 5, wherein the organosilane is selected from the group consisting of amino-$(C_1$-$C_6)$alkyl-$(C_1$-$C_6)$alkoxysilanes, acryloxy-$(C_1$-$C_6)$alkyl- ($C_1$-$C_6$)alkoxy-silanes, methacryloxy-($C_1$-$C_6$)alkyl-($C_1$-$C_6$) alkoxy-silanes, glycidoxy-($C_1$-$C_6$)alkyl-($C_1$-$C_6$) alkoxysilanes, mercapto-($C_1$-$C_6$)alkyl-($C_1$-$C_6$)alkoxy-silanes, di- or polysulphides of ($C_1$-$C_{20}$)alkyl-($C_1$-$C_6$) alkoxy-silanes, maleimido-($C_1$-$C_6$)alkyl-($C_1$-$C_6$) alkoxysilanes, isomaleimido-($C_1$-$C_6$)alkyl-($C_1$-$C_6$) alkoxysilanes, N-[($C_1$-$C_6$)alkyl-($C_1$-$C_6$)alkoxysilyl] maleamic acids, and mixtures of these organosilanes.

7. The metallic body according to claim 6, wherein the organosilane is an amino-($C_1$-$C_6$)alkyl-($C_1$-$C_6$)alkoxysilane or a maleimido-($C_1$-$C_6$)alkyl-($C_1$-$C_6$)alkoxysilane.

8. The metallic body according to claim 7, wherein the organosilane is 3-aminopropyl-triethoxysilane or 3-maleimidopropyltriethoxysilane.

9. The metallic body according to claim 1, wherein the aluminum oxides or hydroxides are selected from the group consisting of aluminas, aluminum tri-hydroxides, aluminum oxide-hydroxides and mixtures of these oxides or hydroxides.

10. The metallic body according to claim 4, wherein the aluminum alloy is selected from the group consisting of the binary alloys Al—Mg, Al—Cu, Al—Ni, Al—Zn and ternary alloys of Al and two of the elements Mg, Cu, Ni, and Zn.

11. The metallic body according to claim 10, wherein the aluminum alloy is an Al—Zn binary alloy.

12. The metallic body according to claim 1, wherein the carbon steel has a carbon content of between 0.5% and 1.1% by weight.

* * * * *